United States Patent
Wu et al.

(10) Patent No.: US 12,153,492 B1
(45) Date of Patent: Nov. 26, 2024

(54) MANAGING ERROR CORRECTIONS FOR MEMORY SYSTEMS

(71) Applicant: Macronix International Co., Ltd., Hsinchu (TW)

(72) Inventors: Sheng-Han Wu, Hsinchu (TW); Yu-Ming Huang, Taipei (TW)

(73) Assignee: Macronix International Co., Ltd., Hsinchu (TW)

( * ) Notice: Subject to any disclaimer, the term of this patent is extended or adjusted under 35 U.S.C. 154(b) by 0 days.

(21) Appl. No.: 18/350,877

(22) Filed: Jul. 12, 2023

(51) Int. Cl.
  *G06F 11/10* (2006.01)
  *G06F 11/20* (2006.01)

(52) U.S. Cl.
  CPC ...... *G06F 11/1092* (2013.01); *G06F 11/1044* (2013.01); *G06F 11/1064* (2013.01); *G06F 11/1068* (2013.01); *G06F 11/1072* (2013.01); *G06F 11/1076* (2013.01); *G06F 11/108* (2013.01); *G06F 11/2089* (2013.01)

(58) Field of Classification Search
  CPC ............. G06F 11/1092; G06F 11/1076; G06F 11/108; G06F 11/1064; G06F 11/1068; G06F 11/1072; G06F 11/1044; G06F 11/2089
  USPC ....... 714/755, 758, 766, 768, 769, 773, 799, 714/800
  See application file for complete search history.

(56) References Cited

U.S. PATENT DOCUMENTS

| | | | |
|---|---|---|---|
| 7,559,004 B1 * | 7/2009 | Chang | H03M 13/09 714/708 |
| 2012/0084622 A1 * | 4/2012 | D'Abreu | G06F 11/1048 714/755 |
| 2013/0283122 A1 * | 10/2013 | Anholt | H03M 13/29 714/755 |
| 2016/0034346 A1 * | 2/2016 | Michael | H03M 13/13 714/755 |
| 2016/0357632 A1 * | 12/2016 | d'Abreu | G06F 11/1072 |
| 2017/0046225 A1 * | 2/2017 | Yang | G06F 11/1072 |
| 2023/0086696 A1 * | 3/2023 | Chen | G06F 11/1004 714/801 |

FOREIGN PATENT DOCUMENTS

| | | |
|---|---|---|
| TW | 200832368 | 8/2008 |
| TW | 201500925 | 1/2015 |
| TW | 202009942 | 3/2020 |
| TW | 202309914 | 3/2023 |

* cited by examiner

*Primary Examiner* — John J Tabone, Jr.
(74) *Attorney, Agent, or Firm* — Fish & Richardson P.C.

(57) ABSTRACT

Systems, methods, and apparatus including computer-readable mediums for managing error corrections for memory systems are provided. In one aspect, a memory system includes a memory and a memory controller coupled to the memory. The memory controller is configured to: read data from a data page of the memory, perform a first phase Error-Correcting Code (ECC) test on the read data based on first ECC data associated with the data, and in response to determining that the read data fails to pass the first phase ECC test, perform a second phase ECC test on a portion of the read data based on second ECC data. The first ECC data is stored together with the data in the data page. The second ECC data is associated with a portion of the data corresponding to the portion of the read data, and stored in a redundancy page different from the data page.

22 Claims, 6 Drawing Sheets

MANAGING ERROR CORRECTIONS FOR MEMORY SYSTEMS

TECHNICAL FIELD

The present disclosure is directed to memory systems, e.g., error corrections for memory systems.

BACKGROUND

Once memory cells in a data storage device, e.g., a memory system, are programmed, data can be read from the memory cells by sensing a programmed state of each memory cell by comparing a cell threshold voltage to one or more read voltages. However, the cell threshold voltage may change due to one or more factors, such as read disturbance or data retention, which may make the sensed programming states different from the written programmed states and cause failed bits in a reading output of the data.

SUMMARY

The present disclosure describes systems and techniques for managing error corrections for memory systems, e.g., non-volatile memory (NVM) systems.

One aspect of the present disclosure features a memory system, including: a memory and a memory controller coupled to the memory and configured to: read data from a data page of the memory; perform a first phase Error-Correcting Code (ECC) test on the read data based on first ECC data associated with the data, the first ECC data being stored together with the data in the data page; and in response to determining that the read data fails to pass the first phase ECC test, perform a second phase ECC test on a portion of the read data based on second ECC data, where the second ECC data is associated with a portion of the data corresponding to the portion of the read data, and stored in a redundancy page different from the data page. In some implementations, a size of the second ECC data is identical to a size of the first ECC data.

In some implementations, the data includes multiple portions including the portion of the data as a first portion of the data and a second portion of the data, and the read data includes multiple portions of the read data including the portion of the read data as a first portion of the read data and a second portion of the read data corresponding to the second portion of the data. The memory controller is configured to: in response to determining that the first portion of the read data passes the second phase ECC test, perform the first phase ECC test on the second portion of the read data and corrected data of the first portion of the read data based on the first ECC data.

In some implementations, the memory controller is configured to: in response to determining that the second portion of the read data and the corrected data of the first portion of the read data pass the first phase ECC test, output corrected data of the second portion of the read data and the corrected data of the first portion of the read data as readout data of the data.

In some implementations, the memory controller includes a RAID (redundant array of independent disks) circuit, and the memory controller is configured to: in response to determining that the portion of the read data fails to pass the second phase ECC test, perform an error correction on the read data using the RAID circuit. The RAID circuit can be configured to store redundancy data for the data in one or more other memory devices external to the memory.

In some implementations, the memory controller includes an ECC decoder, and the memory controller is configured to perform the first phase ECC test and the second phase ECC test using the ECC decoder.

In some implementations, the memory controller is configured to: in response to determining that the read data fails to pass the first phase ECC test, read the second ECC data from the redundancy page; and execute an ECC decoding operation on a combination of the portion of the read data and a plurality of predetermined values using the second ECC data, where a total size of the portion of the read data and the plurality of predetermined values is identical to a size of the read data.

In some implementations, the memory controller includes an ECC encoder configured to: generate the first ECC data based on the data; and generate the second ECC data based on the portion of the data and the plurality of predetermined values.

In some implementations, the memory controller is configured to: extract the portion of the data from the data page and store the portion of the data into a cache page; fill the plurality of predetermined values in the cache page by a processing unit or a particular circuit; and encode the portion of the data and the plurality of predetermined values to generate the second ECC data.

In some implementations, the plurality of predetermined values include at least one of 0 or 1. In some implementations, the first ECC data includes ECC check bits generated for the data using an ECC encoder. In some implementations, a size of the portion of data is one half of a size of the data.

In some implementations, the memory controller is configured to: execute an ECC decoding operation on the read data based on the first ECC data; determine whether a number of error bits in the read data after the ECC decoding operation is smaller than a predetermined threshold; if the number of error bits is smaller than the predetermined threshold, determine that the read data passes the first phase ECC test; and if the number of error bits is identical to or greater than the predetermined threshold, determine that the read data fails to pass the first phase ECC test.

In some implementations, the memory controller is configured to: execute an ECC decoding operation on the portion of the read data based on the second ECC data; determine whether a number of error bits in the portion of the read data after the ECC decoding operation is smaller than a predetermined threshold; if the number of error bits is smaller than the predetermined threshold, determine that the portion of the read data passes the second phase ECC test; and if the number of error bits is identical to or greater than the predetermined threshold, determine that the portion of the read data fails to pass the second phase ECC test.

In some implementations, the redundancy page includes ECC parity data associated with the second ECC data, and the memory controller is configured to: execute an ECC decoding operation on the second ECC data based on the ECC parity data to generate corrected second ECC data; and perform the second phase ECC test on the portion of the read data based on the corrected second ECC data.

In some implementations, the memory includes a plurality of data pages including the data page as a first data page, the redundancy page being different from each of the plurality of data pages, and the redundancy page includes a plurality of second ECC data associated with particular portions of page data in the plurality of data pages. A total size of the plurality of second ECC data is no greater than a size of the data.

In some implementations, a size of a particular portion of page data in each of the plurality of data pages is identical, and the memory controller is configured to: for each of the plurality of data pages, generate respective first ECC data based on the page data in the data page, and store the respective first ECC data in the data page; and generate respective second ECC data based on the particular portion of the page data in the data page and a plurality of predetermined values, and store the respective second ECC data for the data page in the redundancy page. A total size of the particular portion of page data in the data page and the plurality of predetermined values can be identical to a size of the page data in the data page.

In some implementations, the memory includes one or more memory chips each having a plurality of blocks, and the plurality of data pages are in a same block of one of the one or more memory chips, and the redundancy page is in the same block or a different block in the one of the one or more memory chips, or where at least two of the plurality of data pages are in different blocks of one of the one or more memory chips, and the redundancy page is in the one of the one or more memory chips or a different one of the one or more memory chips, or where at least two of the plurality of data pages are in different memory chips of the memory, and the redundancy page is in the memory.

In some implementations, the memory system includes: a first memory device including the memory and the memory controller; and a second memory device. The redundancy page includes particular second ECC data associated with a particular data page in the second memory device.

In some implementations, the memory controller is configured to: generate respective first ECC data based on page data of each of two or more data pages of the plurality of data pages, and store the respective first ECC data in each of the two or more data pages; generate composite data based on particular portions of the two or more data pages, a size of the composite data being identical to a size of each of the particular portions of the two or more data pages; and generate corresponding second ECC data based on the composite data and a plurality of predetermined values, and store the corresponding second ECC data for the two or more data pages in the redundancy page.

In some implementations, the memory controller is configured to generate the composite data by applying an XOR logic operation on the particular portions of the two or more data pages.

In some implementations, the memory controller is configured to: read first page data from a first data page of the two or more data pages; perform a first phase ECC test on the read first page data based on the respective first ECC data of the first data page; in response to determining that the read first page data fails to pass the first phase ECC test, read other page data from one or more other data pages of the two or more data pages; read the corresponding second ECC data for the two or more data pages from the redundancy page; and perform a second phase ECC test on a first data portion of the read first page data and the plurality of predetermined values based on the corresponding second ECC data and the other page data from the one or more other data pages.

Another aspect of the present disclosure features a memory system, including: a memory; and a memory controller coupled to the memory and configured to: generate first Error-Correcting Code (ECC) data based on data in a data page of the memory; store the first ECC data together with the data in the data page; generate second ECC data based on a portion of the data in the data page; and store the second ECC data for the data page in a redundancy page different from the data page.

In some implementations, the memory controller is configured to: generate the second ECC data based on the portion of the data in the data page and a plurality of predetermined values. A total size of the portion of data in the data page and the plurality of predetermined values can be identical to a size of the data in the data page. A size of the second ECC data can be identical to a size of the first ECC data.

In some implementations, the memory controller is configured to: read the data from the data page of the memory; perform a first phase ECC test on the read data based on the first ECC data in the data page; and in response to determining that the read data fails to pass the first phase ECC test, read the second ECC data from the redundancy page, and perform a second phase ECC test on a portion of the read data corresponding to the portion of the data based on the second ECC data.

In some implementations, the memory includes a plurality of data pages including the data page, the redundancy page being different from each of the plurality of data pages, and the memory controller is configured to: generate respective first ECC data on page data of each of two or more data pages of the plurality of data pages, and store the respective first ECC data together with the page data in each of the two or more data pages; generate composite data based on particular portions of the page data of the two or more data pages, a size of the composite data being identical to a size of each of the particular portions of the page data of the two or more data pages; and generate corresponding second ECC data based on the composite data, and store the corresponding second ECC data for the two or more data pages in the redundancy page.

In some implementations, the memory controller is configured to generate the corresponding second ECC data based on the composite data and a plurality of predetermined values. In some implementations, the memory controller is configured to generate the composite data by applying an XOR logic operation on the particular portions of the page data of the two or more data pages.

In some implementations, the memory controller is configured to: read first page data from a first data page of the two or more data pages; perform a first phase ECC test on the read first page data based on the respective first ECC data of the first data page; in response to determining that the read first page data fails to pass the first phase ECC test, read one or more other particular portions of page data from one or more other data pages of the two or more data pages; read the corresponding second ECC data for the two or more data pages from the redundancy page; and perform a second phase ECC test on a first data portion of the read first page data and the plurality of predetermined values based on the corresponding second ECC data and the one or more other particular portions of page data from the one or more other data pages.

In some implementations, the memory controller is configured to: perform the second phase ECC test on the first data portion of the read first page data and a plurality of predetermined values based on the corresponding second ECC data and the one or more other particular portions of page data from the one or more other data pages.

Another aspect of the present disclosure features a method including: reading data from a data page of a memory; performing a first phase Error-Correcting Code (ECC) test on the read data based on first ECC data associated with the data, the first ECC data being stored together with the data in the data page; and in response to determining that the read data fails to pass the first phase ECC test, performing a second phase ECC test on a portion of the read data based on second ECC data, where the second ECC data is associated with a portion of the data corresponding to the portion of the read data, and stored in a redundancy page different from the data page.

In some implementations, the method further includes: generating the first ECC data based on the data in the data page, and storing the first ECC data in the data page; and generating the second ECC data based on the portion of the data in the data page and a plurality of predetermined values, and store the second ECC data for the data page in the redundancy page. A total size of the portion of data in the data page and the plurality of predetermined values can be identical to a size of the data in the data page.

Implementations of the above techniques include methods, systems, computer program products and computer-readable media. In one example, a method can be performed by a memory system including a memory and a memory controller coupled to the memory, and the method can include the above-described actions performed by the memory controller and the memory, e.g., the actions for managing error corrections for the memory system. In another example, one such computer program product is suitably embodied in a non-transitory machine-readable medium that stores instructions executable by one or more processors. The instructions are configured to cause the one or more processors to perform the above-described actions. One such computer-readable medium stores instructions that, when executed by one or more processors, are configured to cause the one or more processors to perform the above-described actions.

The details of one or more disclosed implementations are set forth in the accompanying drawings and the description below. Other features, aspects, and advantages will become apparent from the description, the drawings and the claims.

BRIEF DESCRIPTION OF THE DRAWINGS

Like reference numbers and designations in the various drawings indicate like elements. It is also to be understood that the various exemplary implementations shown in the figures are merely illustrative representations and are not necessarily drawn to scale.

DETAILED DESCRIPTION

Due to frequent read operations, data stored in a memory may suffer from read disturbance, in which states of memory cells, e.g., an erased state and one or more programmed states, in the memory may have increased threshold voltages. The read disturbance may cause failed bits (or error bits) in reading outputs of the data. An error-correcting code (ECC) decoder can be configured to decode the data read from the memory to detect and correct, up to an error correction capability of an ECC scheme, any bit errors that may be present in the data.

RAID (redundant array of independent disks) is a data storage virtualization technology that combines multiple physical disk drive components into one or more logical units for data redundancy, performance improvement, or both. Data is distributed across the different disk drives in one of multiple ways, referred to as RAID levels, depending on a required level of redundancy and performance. The different schemes, or data distribution layouts, are named by the word "RAID" followed by a number, for example, RAID 0, RAID 1, RAID 2, . . . , RAID 9, or more. Each scheme, or RAID level, provides a different balance among the key goals: reliability, availability, performance, and capacity. RAID levels greater than RAID 0 can provide protection against unrecoverable sector read errors, as well as against failures of whole physical drives.

Different from ECC data being stored in a same page as user data, RAID redundant data are stored across different physical disk drive components. Thus, RAID can provide inter-page RAID or inter-disk RAID protection to recover ECC uncorrectable data as an additional protection. However, to perform the inter-page RAID or inter-disk RAID protection, all pages are read for the fail data, which takes much longer time to recover the data than the ECC.

Implementations of the present disclosure provide systems, methods, and techniques for managing error corrections for memory systems, e.g., with multi-phase ECC protections (or multi-phase ECC error corrections). The techniques can enhance the capability of ECC protections (or error corrections) and recover uncorrectable data by normal ECC schemes. The techniques can implement similar functions of RAID using the same ECC hardware (e.g., ECC encoder and decoder), without using RAID circuits and/or without changing existing hardware configurations. The techniques can also be implemented with the RAID circuits or technology for additional/further enhanced data corrections and protections.

Figure 2:
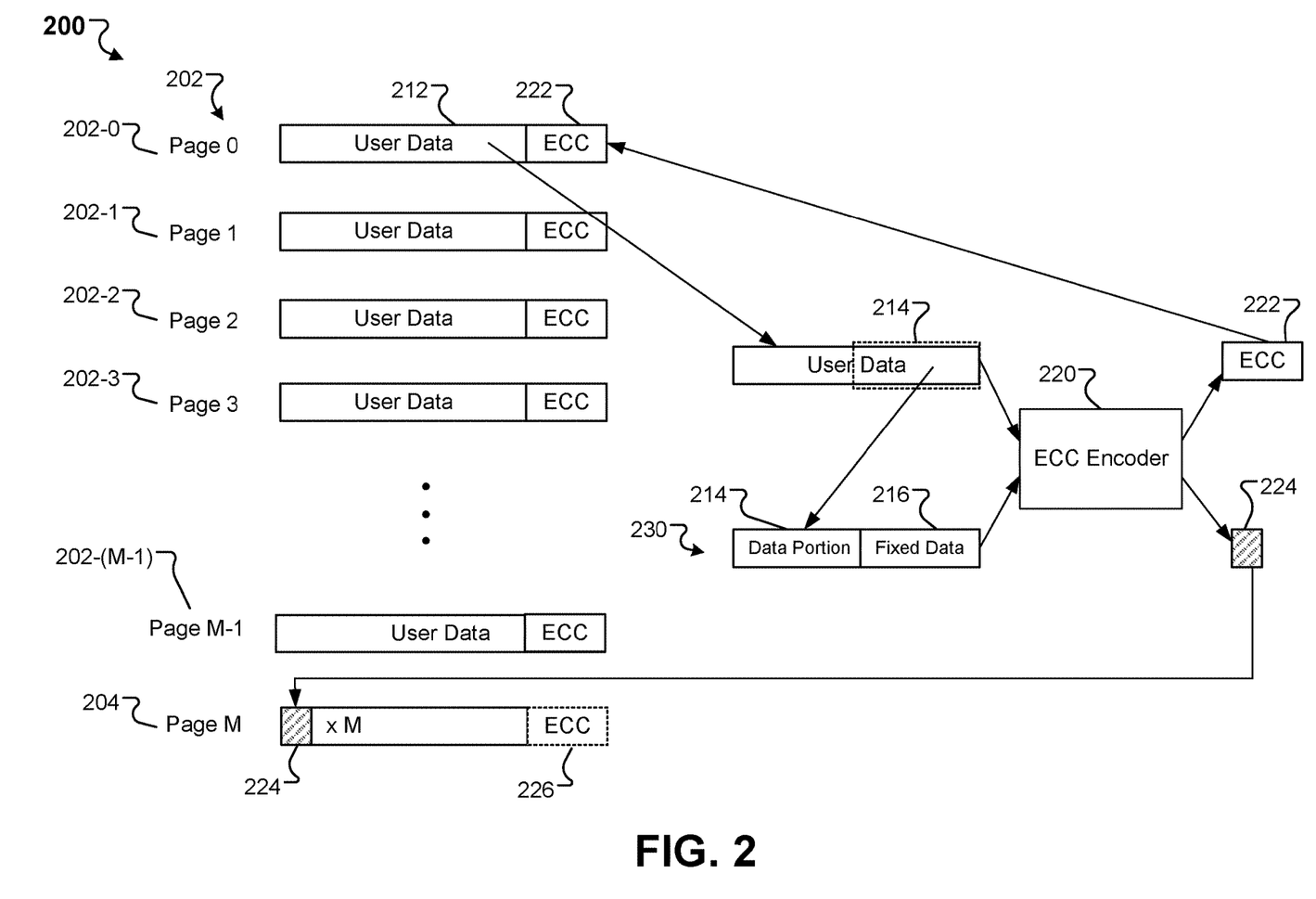
FIG. 2 illustrates an example of generating multi-phase ECC data for error corrections in a memory system.
Figure 4A:
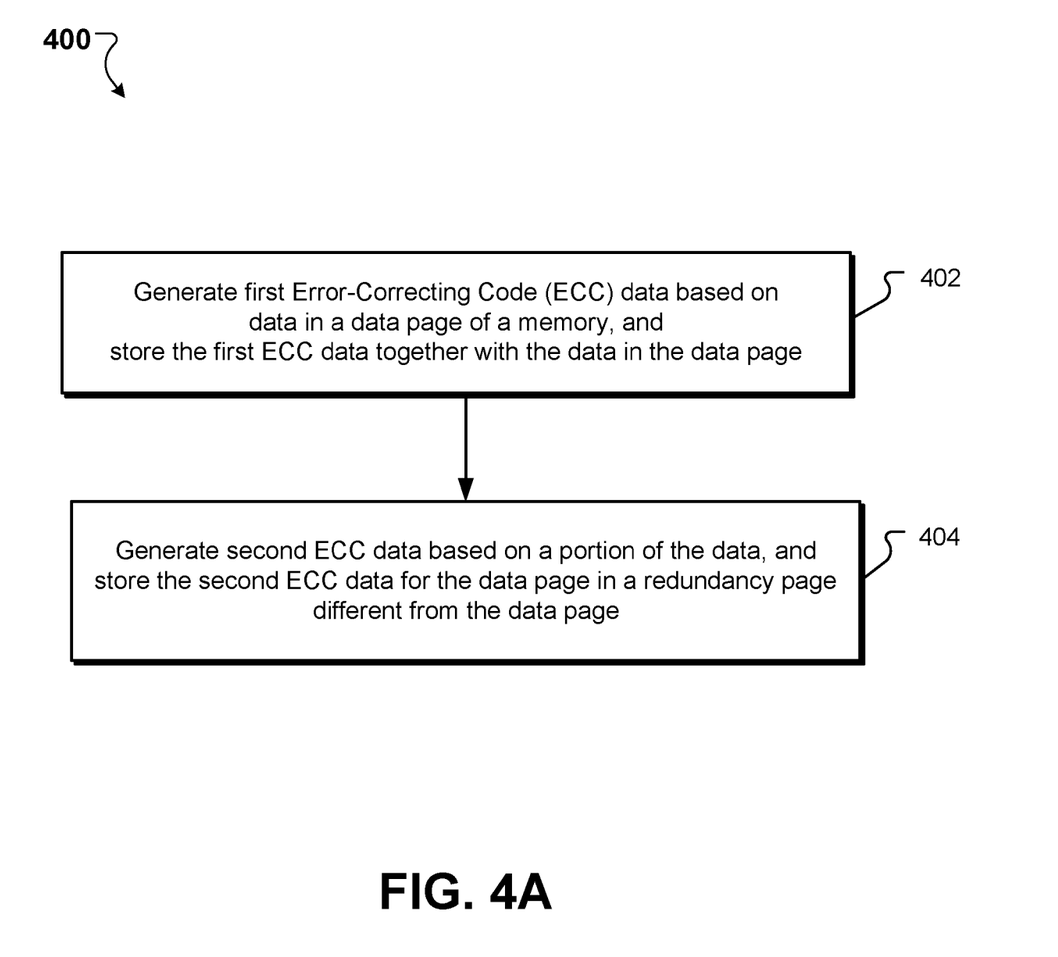
FIG. 4A is a flowchart of an example process of generating multi-phase ECC data for error corrections in a memory system.

In some implementations, e.g., as discussed with further details with respect to FIGS. 2 and 4A, for a first phase ECC protection, an ECC encoder encodes data in each data page of a memory to generate first ECC data that is stored together with the data in the data page; for a second phase ECC protection, the ECC encoder encodes a portion of the data (e.g., half of the data), together with predetermined values (e.g., 1 or 0), to generate second ECC data that is stored, separated from the data, in a redundancy page. The redundancy page can store second ECC data for portions of data from a number of pages. As the predetermined values are fixed, the second ECC data is just used to correct the portion of the data (e.g., half of the data), thus, the second ECC data can provide a higher ECC capability than the first ECC data. As an example, if the portion of the data is half of the data and the second ECC data includes a same length of ECC check bits as the first ECC data, the second ECC data can have a double ECC capability than the first ECC data.

Figure 4B:
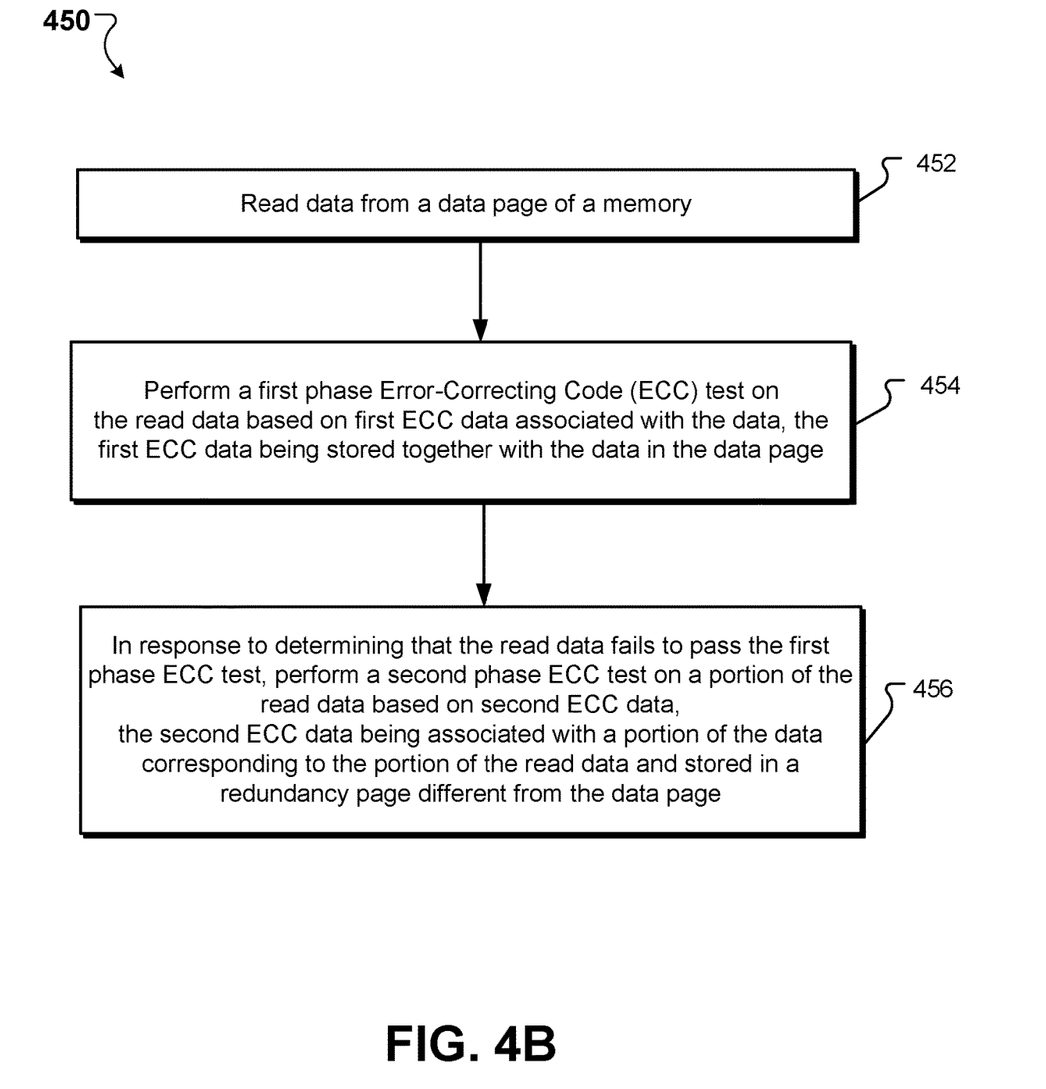
FIG. 4B is a flowchart of an example process of managing error corrections in a memory system.

In a read operation, e.g., as discussed with further details with respect to FIG. 4B, when the first ECC data in the data page fails to correct the data, e.g., the first phase ECC protection fails, a controller can retrieve (or extract) the second ECC data for the data page from the redundancy page. As the second ECC data has a higher ECC capability, the second ECC data can be used to correct the portion of the data. After the portion of the data is corrected, the corrected portion of the data can replace the portion of the data in the data and then the first ECC data can be used to correct a remaining portion of the data. As the remaining portion of the data has a smaller size than the data, the first ECC data can have a higher ECC capability for the remaining portion of the data. Thus, the second phase ECC protection enables to recover uncorrectable data of the first phase ECC protection. In the second phase ECC protection, only two pages (the data page and the redundancy page) are read to implement the ECC protection. Compared to RAID technology using inter-page RAID protection where all the pages (e.g., 8 to 128 pages) are required to be read once the first phase ECC protection fails, the techniques implemented herein provide faster speed and faster response.

In some implementations, the second phase ECC protection makes use of RAID technology to further improve the performance. For example, e.g., as discussed with further details with respect to FIG. 3, if a large number of data pages need to be protected with a small number of redundancy pages available, portions of multiple data pages can be protected by using same second ECC data. The portions of multiple data pages can be used to generate composite data, e.g., using one or more logic/mathematical functions such as XOR. The composite data can have a same size as each portion, e.g., half of a data page. The composite data can be then encoded to generate second ECC data to be stored in a redundancy page. In such a way, the redundancy page can provide the second phase ECC protection for more data pages. In a read operation, the multiple data pages for generating the composite data and the second ECC data are read out for the second phase ECC protection of any one of the multiple data pages.

The techniques can be applied in different scenarios. In some implementations, a plurality of data pages are in a same block of a memory chip, and a redundancy page storing second ECC data for the plurality of data pages can be in the same block or a different block in a same memory chip. In some implementations, at least two of the plurality of data pages are in different blocks in a memory chip, and the redundancy page can be in a block of the memory chip or a different memory chip. In some implementations, at least two of the plurality of data pages are in different memory chips of a memory device, and the redundancy page can be in a memory chip of the memory device or in a different memory device. In some implementations, at least two of the plurality of data pages are in different memory devices such as solid-state drives (SSDs) of a memory system, and the redundancy page can be in one of the different memory devices or another memory device in the memory system. The techniques can be applied individually or in combination with RAID technology.

The techniques can be applied to various types of semiconductor devices, volatile memory devices, or non-volatile memory (NVM) devices, such as NAND flash memory, NOR flash memory, resistive random-access memory (RRAM), phase-change memory (PCM) such as phase-change random-access memory (PCRAM), spin-transfer torque (STT)-Magnetoresistive random-access memory (MRAM), among others. The techniques can also be applied to charge-trapping based memory devices, e.g., silicon-oxide-nitride-oxide-silicon (SONOS) memory devices, and floating-gate based memory devices. The techniques can be applied to two-dimensional (2D) memory devices or three-dimensional (3D) memory devices. The techniques can be applied to various memory types, such as SLC (single-level cell) devices, MLC (multi-level cell) devices like 2-level cell devices, TLC (triple-level cell) devices, QLC (quad-level cell) devices, or PLC (penta-level cell) devices. Additionally or alternatively, the techniques can be applied to various types of devices and systems, such as secure digital (SD) cards, embedded multimedia cards (eMMC), or solid-state drives (SSDs), embedded systems, among others.

Figure 1A:
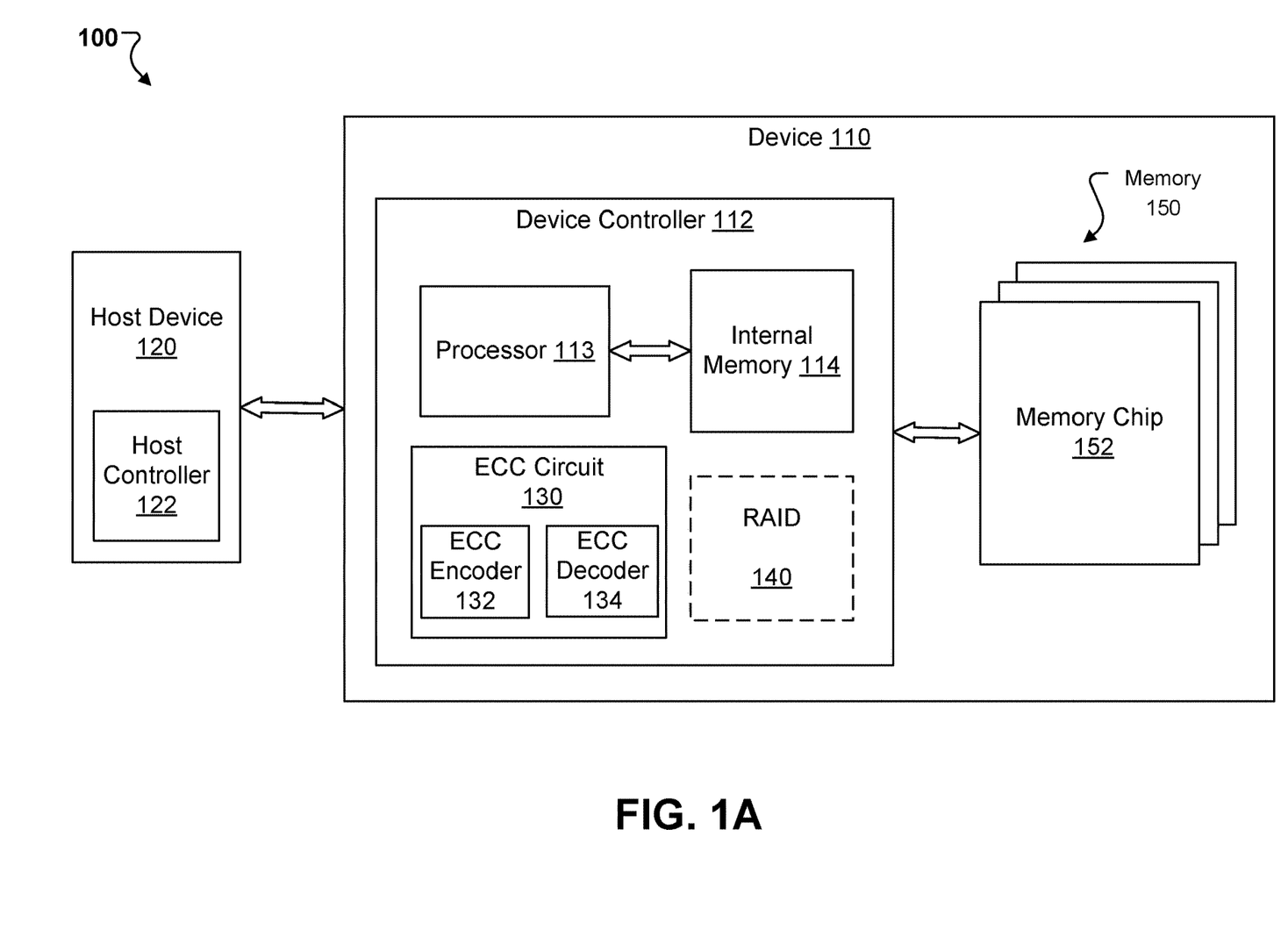
FIG. 1A is a schematic diagram of an example of a system with error correction capabilities.

FIG. 1A illustrates an example of a system 100 with error correction capabilities. The system 100 includes a device 110 and a host device 120. The host device 120 includes a host controller 122 that can include at least one processor and at least one memory coupled to the at least one processor and storing programming instructions for execution by the at least one processor to perform one or more corresponding operations.

In some implementations, the device 110 is a storage device. For example, the device 110 can be an embedded multimedia card (eMMC), a secure digital (SD) card, a solid-state drive (SSD), or some other suitable storage. In some implementations, the device 110 is a smart watch, a digital camera or a media player. In some implementations, the device 110 is a client device that is coupled to a host device 120. For example, the device 110 is an SD card in a digital camera or a media player that is the host device 120.

Figure 1B:
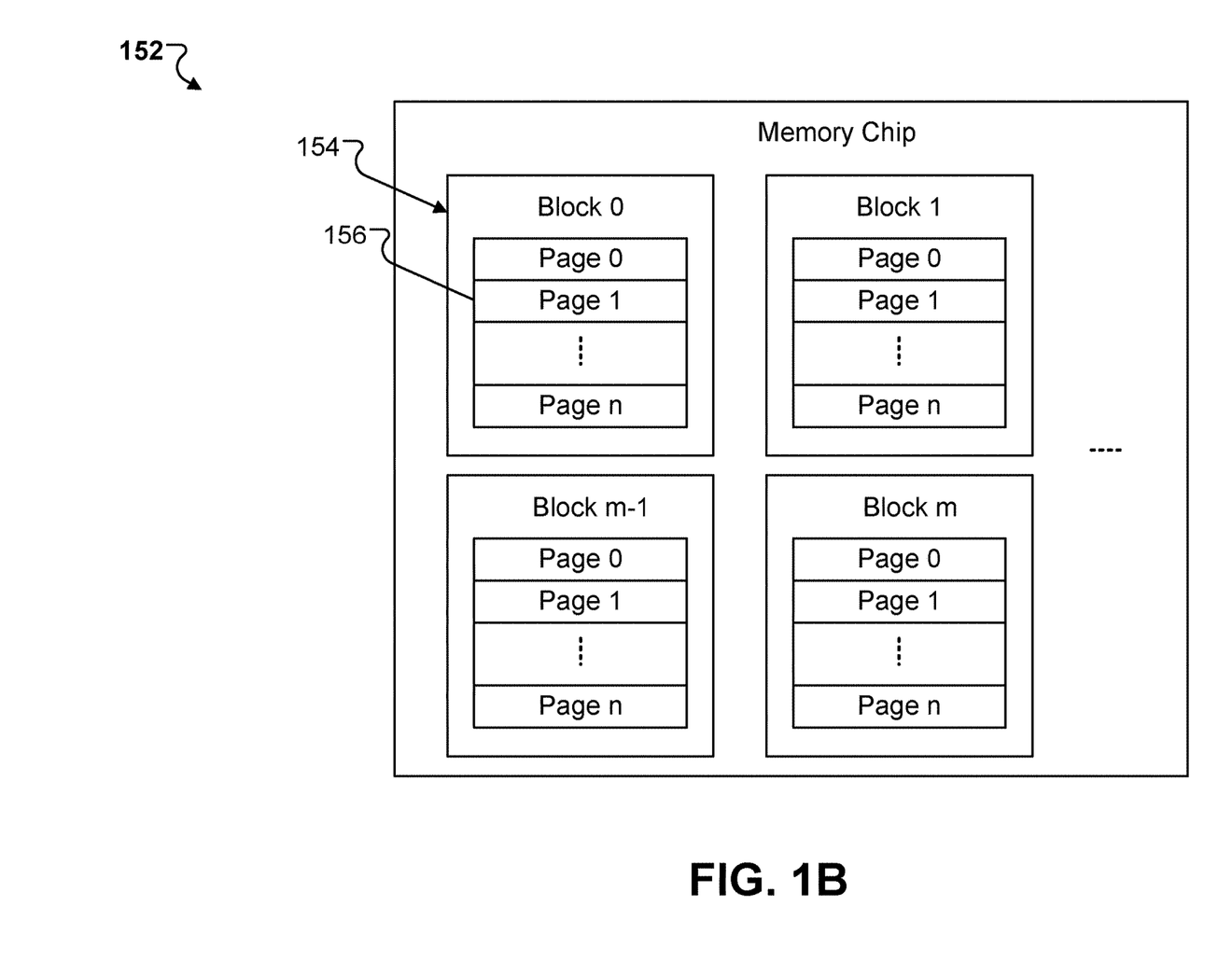
FIG. 1B is a schematic diagram of an example of a memory chip.

In some implementations, the host device 120 is coupled to one or more devices 110 (e.g., SSDs). Each device 110 can include a device controller 112 and a memory 150. The memory 150 can include one or more memory chips 152 each coupled to the device controller 112. FIG. 1B illustrates an example configuration of the memory chip 152 that includes a plurality of blocks 154, e.g., Block 0, Block 1 . . . , Block m−1, and Block m. Each block can include a same number of pages 156, e.g., Page 0, Page 1, . . . , Page n. Each page has a unique number in the block. Data is stored in the pages of the block according to the order of the unique numbers of the pages in the block. Each page can be read or written separately, and pages in a block can be erased together.

The device controller 112 is a general-purpose microprocessor, or an application-specific microcontroller. In some implementations, the device controller 112 is a memory controller for the device 110. The following sections describe the various techniques based on implementations in which the device controller 112 is a memory controller. However, the techniques described in the following sections are also applicable in implementations in which the device controller 112 is another type of controller that is different from a memory controller.

In some implementations, the device controller 112 includes a processor 113 and an internal memory 114. The processor 113 is configured to execute instructions and process data. The instructions include firmware instructions and/or other program instructions that are stored as firmware code and/or other program code, respectively, in the secondary memory. The data includes program data corresponding to the firmware and/or other programs executed by the processor, among other suitable data. In some implementations, the processor 113 is a general-purpose microprocessor, or an application-specific microcontroller. The processor 113 is also referred to as a central processing unit (CPU).

The processor 113 accesses instructions and data from the internal memory 114. In some implementations, the internal memory 114 is a Static Random Access Memory (SRAM) or a Dynamic Random Access Memory (DRAM). For example, in some implementations, when the device 110 is an eMMC, an SD card or a smart watch, the internal memory 114 is an SRAM. In some implementations, when the device 110 is a digital camera or a media player, the internal memory 114 is DRAM.

In some implementations, the internal memory 114 is a cache memory that is included in the device controller 112, as shown in FIG. 1A. The internal memory 114 stores instruction codes, which correspond to the instructions executed by the processor 113, and/or the data that are requested by the processor 113 during runtime.

The device controller 112 transfers the instruction code and/or the data from the memory 150 to the internal memory 114. In some implementations, the memory 150 is a storage device or a non-volatile memory (NVM) that is configured for long-term storage of instructions and/or data, e.g., a NAND flash memory device, or some other suitable non-volatile memory device. In implementations where the memory 150 is NAND flash memory, the device 110 is a flash memory device, e.g., a flash memory card, and the device controller 112 is a NAND flash controller. For example, in some implementations, when the device 110 is an eMMC or an SD card, the memory 150 is a NAND flash; in some implementations, when the device 110 is a digital camera, the memory 150 is an SD card; and in some implementations, when the device 110 is a media player, the memory 150 is a hard disk.

In some implementations, the device controller 112 is configured to receive data and instructions from and to send data to the host device 120. The device controller 112 is further configured to send data and commands to the memory 150 and to receive data from the memory 150. For example, the device controller 112 is configured to send data and a write command to instruct the memory 150 to store the data to a specified address. As another example, the device controller 112 is configured to receive a read request (or a read command) from the host device 120 and send a corresponding read command to the memory 150 to read data from a specified address in the memory 150.

In some implementations, as shown in FIG. 1A, the device controller 112 includes an ECC circuit 130. The ECC circuit 130 can include an ECC encoder 132 and an ECC decoder 134. In some implementations, the ECC circuit 130 can be arranged to be externally coupled to the device controller 112.

The ECC encoder 132 can be configured to receive data to be stored in the memory 150 and to generate check bits, e.g., by encoding the data using an ECC encoding scheme. The check bits can be referred to as ECC data. The ECC encoder 132 can include a Reed Solomon encoder, a Bose-Chaudhuri-Hocquenghem (BCH) encoder, a low-density parity check (LDPC) encoder, or any combination thereof. The ECC decoder 134 can be configured to decode data read from the memory 150 to detect and correct, up to an error correction capability of the ECC scheme, any bit errors that may be present in the data. The ECC decoder 134 can perform BCH decoding or LDPC decoding.

In some implementations, the ECC encoder 132 is configured to encode data with a predetermined length or size (e.g., 4 KB) to generate ECC data with a predetermined size (e.g., 512 B). The ECC decoder 134 is configured to decode data with a predetermined length or size (e.g., 4 KB) using ECC data with a predetermined size (e.g., 512 B). For same size data, a larger size ECC data can provide a higher error correction capability than a smaller size ECC data. For same size ECC data, the ECC data can provide a higher error correction capability for smaller size data than larger size data. For example, a 4 KB ECC encoder generates 512 B ECC data. If the ECC encoder is used to encode 2 KB data and 2 KB predetermined (or fixed) values (e.g., 1 or 0) to generate 512 B ECC data. When the ECC decoder decodes data using ECC data, the 512 B ECC data generated based on the 2 KB data can provide a higher error correction capability than 512 B ECC data generated based on 4 KB data. As discussed with further details below, e.g., with respect to FIGS. 2, 3, and 4A-4B, the ECC encoder 132 and the ECC decoder 134 can be used to provide multi-phase ECC protections.

In some implementations, the device controller 112 includes a RAID circuit (or RAID circuitry) 140 configured to protect data using RAID technology. The RAID circuit 140 can distribute data across the different disk drives in a RAID level, e.g., RAID 0, RAID 1, RAID 2, ..., RAID 9, or any combination thereof. The RAID circuit 140 can be configured to provide a further phase error protection if the multi-phase ECC protections using the ECC circuit 130 fail.

FIG. 2 illustrates an example 200 of generating multi-phase ECC data for error corrections in a memory system. The memory system can include a memory device (e.g., the device 110 of FIG. 1A) having a memory controller (e.g., the device controller 112 of FIG. 1A) and a memory (e.g., the memory 150 of FIG. 1A). The memory can include one or more memory chips (e.g., the memory chip 152 of FIGS. 1A-1B). Each memory chip includes a plurality of blocks (e.g., the blocks 154 of FIG. 1B) that each includes a plurality of pages (e.g., the pages 156 of FIG. 1B).

For illustration, multi-phase ECC protections (or multi-phase ECC error corrections) are implemented for a plurality of data pages (e.g., Page 0 202-0, Page 1 202-1, Page 2 202-2, Page 3 202-3, ...., Page M−1 202-(M−1)), which can be referred to generally as data pages 202 and individually as data page 202. M is an integer equal to or greater than 1. In a particular example, M is 7. Each data page 202 stores respective user data 212 in the data page 202.

For the first phase ECC protection, an ECC encoder 220 (e.g., the ECC encoder 132 of FIG. 1A) encodes user data 212 from each of the plurality of data pages 202, e.g., Page 0 202-0 shown in FIG. 2, to generate ECC data 222. As noted above, the ECC encoder 220 can include a Reed Solomon encoder, a Bose-Chaudhuri-Hocquenghem (BCH) encoder, a low-density parity check (LDPC) encoder, or any combination thereof. The ECC data 222 can include ECC check bits (or ECC protection bits) for the user data 212. The ECC data 222 can be stored in the same data page 202 as the user data 212, e.g., appended to the user data 212 in the data page 202.

The ECC encoder 220 is configured to encode data with a predetermined length or size to generate ECC data with a predetermined size. For example, the ECC encoder 220 can be a 4 KB ECC encoder configured to encode data with 4 KB size. The user data 212 can have a size of 4 KB, and the ECC data 222 can have a size of 512 B. In some examples, the data page 202 stores 16 KB user data. The ECC encoder 220 can encode every 4 KB user data 212 to generate corresponding ECC data 222 with a size of 512 B and store the corresponding ECC data 222 immediately adjacent to the user data 212 in the data page 202. The ECC encoder 220 can repeat 4 times to encode all the 16 KB user data in the data page 202. The corresponding ECC data 222 can be referred to as first phase ECC data or first ECC data. Note that the terms "first phase ECC data" and "first ECC data" can be used interchangeably in the present disclosure.

For the second phase ECC protection, as illustrated in FIG. 2, a controller (e.g., the device controller 112 of FIG. 1A) can extract a data portion 214 of the user data 212 from the data page 202 and put the data portion 214 in a cache page 230 as input of the ECC encoder 220. The cache page 230 can be in a cache (or a data buffer) of the controller (e.g., a cache in the internal memory 114 of FIG. 1A or a cache for the ECC encoder 220).

In some implementations, e.g., as illustrated in FIG. 2, the controller fills a remaining space of the cache page 230 with fixed data 216 (e.g., a plurality of predetermined values) such that a total size of the data portion 214 and the fixed data 216 is compatible with (e.g., identical to) a predetermined data size for the ECC encoder 220. The fixed data 216 can be filled in the cache page 230 by a processor (e.g., the processor 113 of FIG. 1A) of the controller or a particular circuit in the controller that is configured to fill data. The fixed data 216 can include at least one of 1, 0, or any fixed value.

In some examples, the ECC encoder 220 is a 4 KB ECC encoder 220, and the user data 212 is 4 KB. If the data portion 214 is half of the user data 212, e.g., 2 KB, the fixed data 216 filled in the cache page has a size of 2 KB. In such a way, the encoder 220 can be still used to encode data in the cache page 230 (e.g., the data portion 214 and the predetermined values 216) to generate ECC data 224. The ECC data 224 can have a same size as the ECC data 222, e.g., 512 B.

Compared to the ECC data 222 for the user data 212, the ECC data 224 is for the data portion 214 and the fixed data 216. As the fixed data 216 includes predetermined/fixed values, without error bits, the ECC data 224 can be all used to decode and correct the data portion 214 (e.g., by using an ECC decoder such as the ECC decoder 134 of FIG. 1A). As the data portion 214 is a portion of the user data 212 and has a smaller size than the user data 212, if the ECC data 224 has a same size as the ECC data 222, the ECC data 224 can have a higher error correction capability for the data portion 214 than the ECC data 222 for the user data 212. For example, if the data portion 214 is a half of the user data 212 and the ECC data 224 has a same size as the ECC data 222, the ECC data 224 has double error correction capability than the ECC data 222.

The ECC data 224 can be referred to as second phase ECC data or second ECC data. Note that the terms "second phase ECC data" and "second ECC data" can be used interchangeably in the present disclosure. The second phase ECC data 224 can be used to correct the data portion 214 and the user data 212 if the first phase ECC data 222 fails to correct the user data 212. For example, after the data portion 214 is corrected by the second phase ECC data 224, the corrected data portion 214 can replace the data portion in the user data 212, and the first phase ECC data 222 can be used again to decode and correct a remaining portion of the user data 212 with the corrected data portion 214. Thus, the whole user data 212 can be corrected by the first phase ECC data 222 and the second phase ECC data 224.

In some implementations, a size of the data portion 214 is half of a size of the user data 212. That is, the data portion 214 is 50% of the user data 212. The data portion can be also smaller than 50% of the user data 212 or larger than 50% of the user data 212.

The fixed data 216 can be filled in the cache page 230 in any suitable way. In some implementations, the fixed data 216 is arranged adjacent to the data portion 214 in the cache page 230. In some implementations, values (e.g., 1 or 0) in the fixed data 216 are distributed or inserted between bits in the data portion 214. In some implementations, the fixed data 216 is divided into two or more parts that are filled in different locations in the data portion 214.

The ECC data 224 can be stored in a redundancy page 204 (e.g., Page M), e.g., as illustrated in FIG. 2. The controller (e.g., the ECC encoder 220) can generate respective ECC data 224 for each of the plurality of data pages 202. Thus, the redundancy page 204 can store M number of ECC data 224 for the plurality of data pages 202. The redundancy page 204 can have a same size as each of the plurality of data pages 202. A total size of the M number of ECC data 224 can be no greater than the size of the redundancy page 204. The redundancy page 204 can be configured for M data pages 202. In some examples, M is identical to 7. In some implementations, the redundancy page 204 can be optionally encoded, e.g., by the ECC encoder 220, to generate its own ECC data 226 that can be stored adjacent to the second ECC data 224 in the redundancy page 204. The ECC data 226 can be optionally used to correct error bits in the redundancy page 204, e.g., before extracting the second phase ECC data 224 for second phase ECC protection.

The redundancy page 204 can be different from each of the plurality of data pages 202. In some implementations, the plurality of data pages 202 are in a same block of a memory chip, and the redundancy page 204 can be in the same block or a different block in the memory chip. In some implementations, at least two of the plurality of data pages 202 are in different blocks of a memory chip, and the redundancy page 204 can be in the same memory chip or a different memory chip of a same memory. In some implementations, at least two of the plurality of data pages 202 are in at least two memory chips of a same memory, and the redundancy page 204 can be in a memory chip different from the at least two memory chips in the memory. In some implementations, at least two of the plurality of data pages 202 are in at least two memory devices (e.g., SSDs) in a memory system, and the redundancy page 204 can be in a memory device different from the at least two memory devices in the memory system.

In some implementations, the controller includes a second ECC encoder that can be different from the ECC encoder 220. The second ECC encoder can be configured to encode data with a size same as the data portion 214 (e.g., 2 KB). Accordingly, the controller can include a corresponding second ECC decoder configured to decode data with a size same as the data portion 214 (e.g., 2 KB). There can be no need to add additional data (e.g., the fixed data 216) in a cache page for the data portion 214. Instead, the data portion 214 can be directly used as an input of the second ECC encoder. In some examples, ECC data generated by the second ECC encoder can have a same size as the ECC data 224 or the ECC data 222. In such a way, the ECC data generated by the second ECC encoder can have a higher error correction capability than the ECC data 222 for the user data 212. The ECC data generated by the second ECC encoder can be also used as second phase ECC data (or second ECC data) for providing a second phase protection if the first phase ECC protection using the first phase ECC data 222 fails.

In some examples, the ECC data generated by the second ECC encoder can have a size larger than the size of the ECC data 222. In some examples, the ECC data generated by the second ECC encoder can have a size smaller than the size of the ECC data 222, but larger than a size threshold. For example, if the data portion 214 has a half size of the user data 212, the size threshold can be a half size of the ECC data 222.

Figure 3:
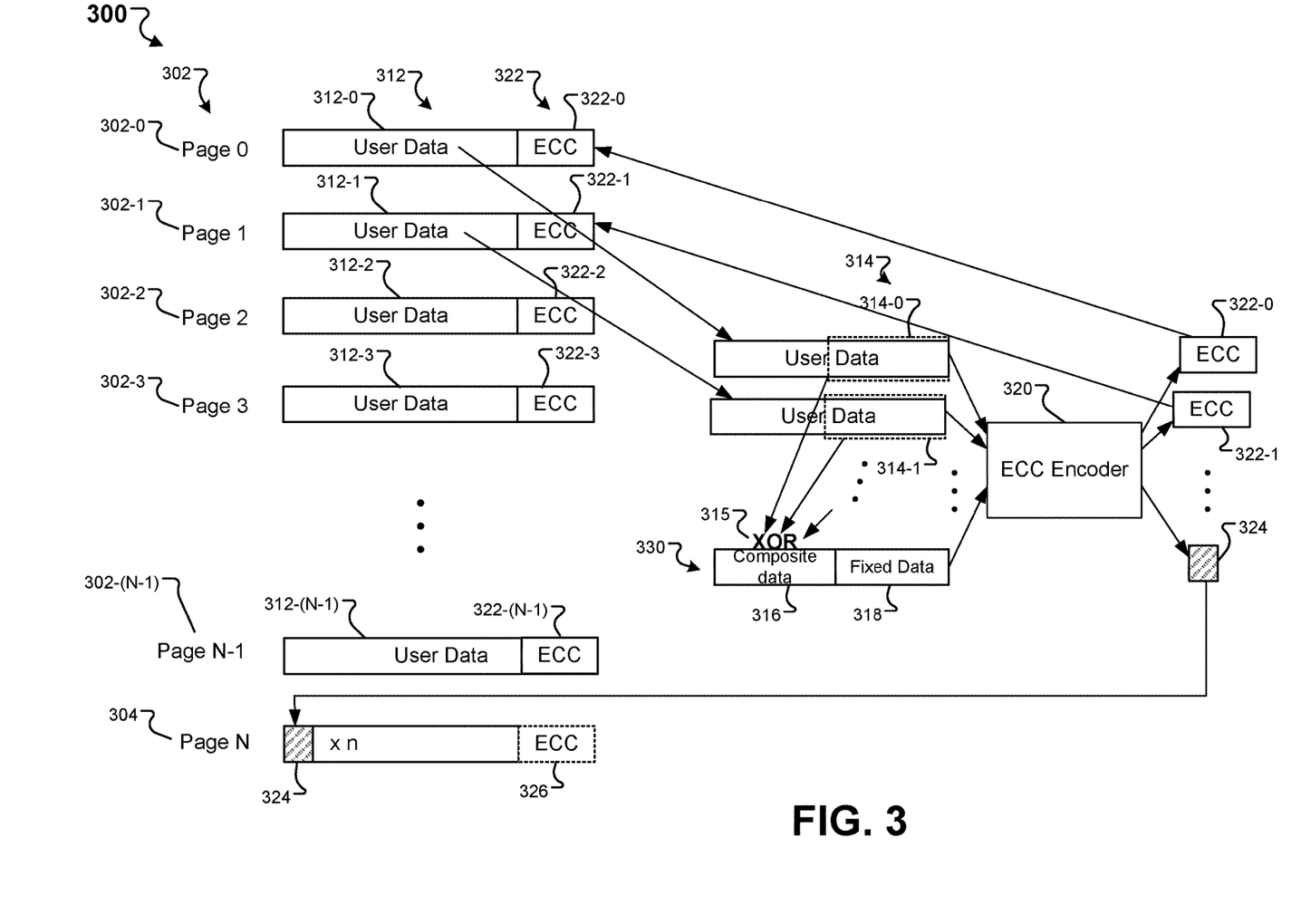
FIG. 3 illustrates another example of generating multi-phase ECC data for error corrections in a memory system.

FIG. 3 illustrates another example 300 of generating multi-phase ECC data for error corrections in a memory system. Different from the example 200 of FIG. 2 where each data page has respective second phase ECC data, the example 300 uses one or more logic and/or mathematical operations (e.g., XOR) on data portions of multiple data pages to get single second phase ECC data for the multiple data pages, which can save a space in a redundancy page and/or reduce a number of redundancy pages for storing second phase ECC data for a large number of data pages for multi-phase ECC protection.

Similar to the example 200 of FIG. 2, the memory system can include a memory device (e.g., the device 110 of FIG. 1A) having a memory controller (e.g., the device controller 112 of FIG. 1A) and a memory (e.g., the memory 150 of FIG. 1A). The memory can include one or more memory chips (e.g., the memory chip 152 of FIGS. 1A-1B). Each memory chip includes a plurality of blocks (e.g., the blocks 154 of FIG. 1B) that each include a plurality of pages (e.g., the pages 156 of FIG. 1B). The memory controller can include an ECC encoder 320 (e.g., the ECC encoder 132 of FIG. 1A) and an ECC decoder (e.g., the ECC decoder 134 of FIG. 1A).

For illustration, multi-phase ECC protections (or multi-phase ECC error corrections) are implemented for a plurality of data pages (e.g., Page 0 302-0, Page 1 302-1, Page 2 302-2, and individually as data page 302. N is an integer equal to or greater than 2. In some examples, N is 15, 31, 63, 127, 255, or more.

A data page 302 can be similar to, or same as, the data page 202 of FIG. 2. Each data page 302 stores respective user data 312 in the data page 302. Similar to the example 200 of FIG. 2, in first phase ECC protection, in the example 300, an ECC encoder 320 (e.g., the ECC encoder 132 of FIG. 1A or 220 of FIG. 2) can generate respective first phase ECC data (or first ECC data) 322 for user data 312 in each data page 302, and the first phase ECC data 322 can be stored adjacent to the user data 312 in the data page 302. For example, as illustrated in FIG. 3, Page 0 (data page 302-0) stores user data 312-0 and first phase ECC data 322-0, Page 1 (data page 302-1) stores user data 312-1 and first phase ECC data 322-1, Page 2 (data page 302-2) stores user data 312-2 and first phase ECC data 322-2, Page 3 (data page 302-3) stores user data 312-3 and first phase ECC data 322-3, . . . , and Page N−1 (data page 302-(N−1)) stores user data 312-(N−1) and first phase ECC data 322-(N−1).

For second phase ECC protection, different from the example 200 of FIG. 2 where each data page 202 has respective second phase ECC data 224 in the redundancy page 204 (Page M), the example 300 uses one or more logic or mathematical operations (e.g., XOR) on data portions of multiple data pages to get single second phase ECC data for the multiple data pages in a redundancy page 304 (Page N). The one or more logic or mathematical operations can be similar to, or same as, those used in RAID technology.

For example, as illustrated in FIG. 3, data portion 314-0 of user data 312-0 in Page 0 (data page 302-0) and data portion 314-1 of user data 312-1 in Page 1 (data page 302-1) and optionally one or more other data portions of user data 312 in one or more other data pages 302 can be operated using an XOR operation 315 to generate composite data 316. The XOR operation 315 can be performed by the memory controller (e.g., the ECC encoder 320 or a particular logic gate or circuit) before encoding. The data portion 314-0, 314-1, . . . can be referred to generally as data portions 314 and individually as data portion 314. The composite data 316 has a same size as each of the data portions 314. For example, if the data portion 314 has a size of 2 KB, the composite data 316 also has a size of 2 KB. In such a way, data portions 314 of user data 312 in multiple data pages 302 can be represented by single composite data 316, which can be used to generate second phase ECC data 324 for the multiple data pages 302. The second phase ECC data 324 can have a size same as the first phase ECC data 322, e.g., 512 B.

In some implementations, similar to the example 200 of FIG. 2, in the example 300, the composite data 316 is stored in a cache page 330 as an input for the ECC encoder 320. Fixed data 318 can be filled in the cache page 330. The fixed data 318 can be similar to, or same as the fixed data 216 of FIG. 2. The fixed data 318 can include a plurality of predetermined values, e.g., 1 or 0. A total size of the composite data 316 and the fixed data 318 is identical to the user data 312. In a particular example, each user data 312 has a size of 4 KB, each data portion 314 is half of the user data 312 (i.e., 2 KB), then the composite data 316 has a size of 2 KB, and the fixed data 318 has a size of 2 KB. In such a way, the ECC encoder 320 can be used for generating first phase ECC data 322 and second phase ECC data 324.

The plurality of data pages 302 can be divided into a plurality of groups of data pages 302. Each group of data pages 302 can be associated with respective second phase ECC data 324. The respective second phase ECC data 324 of the plurality of groups can be stored in the redundancy page 304. A total size of the respective second phase ECC data 324 can be no greater than a size of the user data 312 or a space capacity of the redundancy page 304. In some implementations, similar to the example 200 of FIG. 2, in the example 300, the stored second phase ECC data 324 in the redundancy page 304 can be encoded, e.g., by the ECC encoder 320, to generate ECC data 326 that is stored together with the second phase ECC data 324 in the redundancy page 304. During a read operation, the ECC data 326 can be optionally used to correct bit errors in the second phase ECC data 324 stored in the redundancy page 304, before using the second phase ECC data 324 for second phase ECC protection.

The number of the multiple data pages 302 can be an integer greater than 1, and the number of the plurality of groups can be n, an integer greater than 1. In some examples, if the user data 312 has a size of 4 KB and each second phase ECC data 324 has a size of 512B, n can be 8.

In some examples, if the number of the plurality of data pages 302 is 15, e.g., N=15, there can be 7 groups of two data pages 302 and 1 single data page 302. Each group is used to generate composite data 316 and to generate second phase ECC data 324 for the group, and the single data page 302 itself is used to generate second phase ECC data 324 for the single data page 302. There are 8 second phase ECC data 324 for the 15 data pages 302 that are stored in the redundancy page 304. Thus, using the XOR operation, one redundancy page can provide second phase ECC protection for 15 data pages 302.

In some examples, if the number of the plurality of data pages 302 is 31, e.g., N=31, there can be 7 groups of 4 data pages 302 and 1 group of 3 data pages 302. Each group is used to generate composite data 316 and to generate second phase ECC data 324 for the group. There are still 8 second phase ECC data 324 for the 31 data pages 302 that are stored in the redundancy page 304. Thus, using the XOR operation, one redundancy page can provide second phase ECC protection for 31 data pages 302.

In some examples, if the number of the plurality of data pages 302 is 63, e.g., N=63, there can be 7 groups of 8 data pages 302 and 1 group of 7 data pages 302. Each group is used to generate composite data 316 and to generate second phase ECC data 324 for the group. There are 8 second phase ECC data 324 for the 63 data pages 302 that are stored in the redundancy page 304. Thus, using the XOR operation, one redundancy page can provide second phase ECC protection for 63 data pages 302.

Similar to the redundancy page 204 of FIG. 2, the redundancy page 304 can be different from each of the plurality of data pages 302. In some implementations, the plurality of data pages 302 are in a same block of a memory chip, and the redundancy page 304 can be in the same block or a different block in the memory chip. In some implementations, at least two of the plurality of data pages 302 are in different blocks of a memory chip, and the redundancy page 304 can be in the same memory chip or a different memory chip of a same memory. In some implementations, at least two of the plurality of data pages 302 are in at least two memory chips of a same memory, and the redundancy page 304 can be in a memory chip different from the at least two memory chips in the memory. In some implementations, at least two of the plurality of data pages 302 are in at least two memory devices (e.g., SSDs) in a memory system, and the redundancy page 304 can be in a memory device different from the at least two memory devices in the memory system.

FIG. 4A is a flowchart of an example process 400 of generating multi-phase ECC data for error corrections in a memory system. The memory system can include a memory device (e.g., the device 110 of FIG. 1A) having a memory controller (e.g., the device controller 112 of FIG. 1A) and a memory (e.g., the memory 150 of FIG. 1A). The memory can include one or more memory chips (e.g., the memory chip 152 of FIGS. 1A-1B). Each memory chip includes a plurality of blocks (e.g., the blocks 154 of FIG. 1B) that each includes a plurality of pages (e.g., the pages 156 of FIG. 1B). The memory controller can include an ECC encoder (e.g., the ECC encoder 132 of FIG. 1A, 220 of FIG. 2, or 320 of FIG. 3) and an ECC decoder (e.g., the ECC decoder 134 of FIG. 1A). The process 400 can be performed by the memory system, e.g., the memory controller.

The memory system can receive data from a host device, e.g., the host device 120 of FIG. 1A, and store the data in a plurality of data pages in the memory system. The memory system can provide data error protections for the stored data, e.g., multi-phase ECC protections as illustrated in FIG. 2 or 3, and optionally RAID data protection. The plurality of data pages can be the plurality of data pages 202 of FIG. 2 or the plurality of data pages 302 of FIG. 3.

At step 402, first ECC data (or first phase ECC data) is generated based on stored data in each of the plurality of data pages and stored together with the data in the data page. The first ECC data can be generated by the ECC encoder. The stored data in each of the plurality of data pages can be the user data 212 of FIG. 2 or the user data 312 of FIG. 3. The first ECC data can be the first ECC data 222 of FIG. 2 or the first ECC data 322 of FIG. 3.

At step 404, second ECC data (or second phase ECC data) is generated based on a portion of the stored data in each of the plurality of data pages and stored in a redundancy page different from the data page. The redundancy page can be the redundancy page 204 of FIG. 2 or the redundancy page 304 of FIG. 3. The portion of the stored data can be the data portion 214 of FIG. 2 or the data portion 314 of FIG. 3.

In some implementations, e.g., as illustrated in FIG. 2, the memory controller generates the second ECC data based on the portion of the stored data in the data page and a plurality of predetermined values (e.g., the fixed data 216 of FIG. 2). The plurality of predetermined values can include at least one of 1 or 0. The portion of the stored data can be extracted and stored in a cache page (e.g., the cache page 230 of FIG. 2). The portion can be a half of the stored data. The plurality of predetermined values can be filled in the cache page. A total size of the portion of the stored data in the data page and the plurality of predetermined values are identical to a size of the stored data in the data page. The ECC encoder can encode data in the cache page to generate the second ECC data for the data page. The second ECC data for the portion of the stored data in the data page can have a same size of the first ECC data for the stored data in the data page.

In some implementations, the plurality of data pages are divided into multiple groups. Each group can include one or more data pages. For a group including two or more data pages, e.g., as illustrated in FIG. 3, particular portions of page data of the two or more data pages can be first operated, e.g., by XOR operation, to generate composite data (e.g., the composite data 316 of FIG. 3), and then second ECC data (e.g., the second ECC data 324 of FIG. 3) can be generated based on the composite data and a plurality of predetermined values (e.g., the fixed data 318 of FIG. 3). The term "page data" refers to data stored in a data page. The second ECC data for the group can be then stored in the redundancy page. A size of the composite data can be identical to a size of each of the particular portions of the page data of the two or more data pages. A total size of the composite data and the plurality of predetermined values are identical to a size of the page data in the data page. The second ECC data for the particular portions of page data of the two or more data pages can have a same size of the first ECC data for the page data of each of the two or more data pages.

In some implementations, if the memory system includes a RAID circuit (e.g., the RAID circuit 140 of FIG. 1A), the memory system can protect the data using the RAID circuit, e.g., storing data across multiple disk drive components (such as memory chips) in the memory system.

In some implementations, the plurality of data pages are in a same block of a memory chip of the memory, and the redundancy page can be in the same block or a different block in the same memory chip. In some implementations, at least two of the plurality of data pages are in different blocks of a memory chip of the memory, and the redundancy page can be in the same memory chip or a different memory chip of the memory. In some implementations, at least two of the plurality of data pages are in at least two memory chips of the memory, and the redundancy page can be in a memory chip different from the at least two memory chips in the memory. In some implementations, at least two of the plurality of data pages are in at least two memory devices (e.g., SSDs) in a memory system, and the redundancy page can be in a memory device different from the at least two memory devices in the memory system.

FIG. 4B is a flowchart of an example process 450 of managing error corrections in a memory system. The memory system can be similar to, or same as, the memory system of FIG. 4A. The memory system can include a memory device (e.g., the device 110 of FIG. 1A) having a memory controller (e.g., the device controller 112 of FIG. 1A) and a memory (e.g., the memory 150 of FIG. 1A). The memory can include one or more memory chips (e.g., the memory chip 152 of FIGS. 1A-1B). Each memory chip includes a plurality of blocks (e.g., the blocks 154 of FIG. 1B) that each includes a plurality of pages (e.g., the pages 156 of FIG. 1B). The memory controller can include an ECC encoder (e.g., the ECC encoder 132 of FIG. 1A, 220 of FIG. 2, or 320 of FIG. 3) and an ECC decoder (e.g., the ECC decoder 134 of FIG. 1A). The process 450 can be performed by the memory system, e.g., the memory controller.

The memory system can receive a request from a host device, e.g., the host device 120 of FIG. 1A. The request can be a read request for reading stored data in the memory system. As discussed above, the data can be stored in a plurality of data pages with multi-phase ECC protections.

At step 452, data (e.g., the user data 212 of FIG. 2 or 312 of FIG. 3) is read from each of the plurality of data pages (e.g., the data page 202 of FIG. 2 or 302 of FIG. 3). At step 454, a first phase ECC test is performed on the read data based on first ECC data associated with the data, the first ECC data being stored together with the data in the data page. The first ECC data can be the first phase ECC data 222 of FIG. 2 or 322 of FIG. 3.

In some implementations, the memory controller performs the first phase ECC test by executing an ECC decoding operation on the read data based on the first ECC data and determine whether a number of error bits in the read data after the ECC decoding operation is smaller than a predetermined threshold. If the number of error bits is smaller than the predetermined threshold, the memory controller determines that the read data passes the first phase ECC test. The memory controller can then output the read data as output data, e.g., to the host device. If the number of error bits is identical to or greater than the predetermined threshold, the memory controller determines that the read data fails to pass the first phase ECC test.

At step 456, if the read data fails to pass the first phase ECC test, a second phase ECC test on a portion of the read data is performed based on second ECC data. The second ECC data is associated with a portion of the data corresponding to the portion of the read data, and stored in a redundancy page different from each of the plurality of data pages. The second ECC data can be the second ECC data 224 of FIG. 2 or 324 of FIG. 3. A size of the second ECC data can be identical to a size of the first ECC data. The portion of the data can be the data portion 214 of FIG. 2 or the data portion 314 of FIG. 3. A size of the portion of data can be one half of a size of the data. The redundancy page can be the redundancy page 204 of FIG. 2 or 304 of FIG. 3.

In some implementations, the memory controller performs the second phase ECC test by executing an ECC decoding operation (e.g., by an ECC decoder such as the ECC decoder 134 of FIG. 1A) on the portion of the read data based on the second ECC data and determining whether a number of error bits in the portion of the read data after the ECC decoding operation is smaller than a predetermined threshold. The memory controller can perform the first phase ECC test and the second phase ECC test using the same ECC decoder. If the number of error bits is smaller than the predetermined threshold, the memory controller determines that the portion of the read data passes the second phase ECC test. If the number of error bits is identical to or greater than the predetermined threshold, the memory controller determines that the portion of the read data fails to pass the second phase ECC test.

The data can include multiple portions including the portion of the data as a first portion of the data and a second portion (e.g., a remaining portion) of the data. The read data includes multiple portions of the read data including the portion of the read data as a first portion of the read data and a second portion of the read data corresponding to the second portion of the data. If the first portion of the read data passes the second phase ECC test, the memory controller can perform the first phase ECC test on the second portion of the read data and corrected data of the first portion of the read data based on the first ECC data. If the second portion of the read data and the corrected data of the first portion of the read data pass the first phase ECC test, the memory controller can output corrected data of the second portion of the read data and the corrected data of the first portion of the read data as readout data of the data.

In some implementations, the memory controller includes a RAID circuit (e.g., the RAID circuit 140 of FIG. 1A). If the portion of the read data fails to pass the second phase ECC test, the memory controller can perform an error correction on the read data using the RAID circuit, e.g., as a third phase data protection.

In some implementations, in response to determining that the read data fails to pass the first phase ECC test, the memory controller reads the second ECC data from the redundancy page and execute an ECC decoding operation on a combination of the portion of the read data and a plurality of predetermined values using the second ECC data. A total size of the portion of the read data and the plurality of predetermined values is identical to a size of the read data. The plurality of predetermined values can be same as a plurality of predetermined values used to generate the second ECC data. The plurality of predetermined data can be the fixed data 216 of FIG. 2 or the fixed data 318 of FIG. 3. The plurality of predetermined values can include at least one of 0 or 1.

In some implementations, the redundancy page includes ECC parity data (e.g., the ECC data 226 of FIG. 2 or 326 of FIG. 3) associated with the second ECC data. The memory controller can execute an ECC decoding operation on the second ECC data based on the ECC parity data to generate corrected second ECC data, and perform the second phase ECC test on the portion of the read data based on the corrected second ECC data.

In some implementations, e.g., as illustrated in FIG. 2 or 3, the redundancy page includes a plurality of second ECC data associated with particular portions of page data in the plurality of data pages. A total size of the plurality of second ECC data is no greater than a size of the data. A size of a particular portion of page data in each of the plurality of data pages can be identical.

In some implementations, as illustrated in FIG. 3, the plurality of data pages are divided into multiple groups. Each group can include one or more data pages. For a group including two or more data pages, e.g., as illustrated in FIG. 3, particular portions of page data of the two or more data pages can be first operated, e.g., by XOR operation, to generate composite data (e.g., the composite data 316 of FIG. 3), and then second ECC data (e.g., the second ECC data 324 of FIG. 3) can be generated based on the composite data and a plurality of predetermined values (e.g., the fixed data 318 of FIG. 3). The second ECC data for the group can be then stored in the redundancy page. The composite data can have a same size as each particular portion of page data of each of the one or more data pages.

In some implementations, in a read operation, the memory controller reads first page data from a first data page of the two or more data pages (e.g., at step 452) and perform a first phase ECC test on the read first page data based on the respective first ECC data of the first data page (e.g., at step 454). In response to determining that the read first page data fails to pass the first phase ECC test, e.g., at step 456, the memory controller reads other page data from one or more other data pages of the two or more data pages, read the corresponding second ECC data for the two or more data pages from the redundancy page, and perform a second phase ECC test on a first data portion of the read first page data and the plurality of predetermined values based on corresponding second ECC data and the other page data from the one or more other data pages.

The plurality of predetermined values are fixed data without error bits. The ECC decoder can decode the composite data using the corresponding second ECC data, and the decoded composite data can be used with the other page data from the one or more other data pages in a reversed XOR operation to derive the first data portion of the first page data, which can be used to correct the first data portion of the read first page data. The corrected first data portion can be used to correct a remaining portion of the read first page data using the first ECC data for the first page data, as discussed above. Further, after the read first page data in the first data page is corrected, the corrected first page data can be used for error correction for read page data of one or more other data pages.

The disclosed and other examples can be implemented as one or more computer program products, for example, one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, flash memory devices, and magnetic disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A memory system, comprising:
   a memory; and
   a memory controller coupled to the memory and configured to:
   read data from a data page of the memory;
   perform a first phase Error-Correcting Code (ECC) test on the read data based on first ECC data associated with the data, the first ECC data being stored together with the data in the data page; and
   in response to determining that the read data fails to pass the first phase ECC test, perform a second phase ECC test on a portion of the read data based on second ECC data, wherein the second ECC data is associated with a portion of the data corresponding to the portion of the read data, and stored in a redundancy page different from the data page.

2. The memory system of claim 1, wherein the data comprises multiple portions including the portion of the data as a first portion of the data and a second portion of the data, and wherein the read data comprises multiple portions of the read data including the portion of the read data as a first portion of the read data and a second portion of the read data corresponding to the second portion of the data, and wherein the memory controller is configured to:

in response to determining that the first portion of the read data passes the second phase ECC test, perform the first phase ECC test on the second portion of the read data and corrected data of the first portion of the read data based on the first ECC data.

3. The memory system of claim 1, wherein the memory controller comprises a RAID (redundant array of independent disks) circuit, and wherein the memory controller is configured to: in response to determining that the portion of the read data fails to pass the second phase ECC test, perform an error correction on the read data using the RAID circuit.

4. The memory system of claim 1, wherein the memory controller comprises an ECC decoder, and wherein the memory controller is configured to perform the first phase ECC test and the second phase ECC test using the ECC decoder.

5. The memory system of claim 1, wherein the memory controller is configured to:

in response to determining that the read data fails to pass the first phase ECC test, read the second ECC data from the redundancy page; and execute an ECC decoding operation on a combination of the portion of the read data and a plurality of predetermined values using the second ECC data, wherein a total size of the portion of the read data and the plurality of predetermined values is identical to a size of the read data.

6. The memory system of claim 5, wherein the memory controller comprises an ECC encoder configured to:

generate the first ECC data based on the data; and
generate the second ECC data based on the portion of the data and the plurality of predetermined values.

7. The memory system of claim 5, wherein the plurality of predetermined values comprise at least one of 0 or 1.

8. The memory system of claim 1, wherein a size of the portion of data is one half of a size of the data.

9. The memory system of claim 1, wherein the memory controller is configured to:

execute an ECC decoding operation on the read data based on the first ECC data;

determine whether a number of error bits in the read data after the ECC decoding operation is smaller than a predetermined threshold;

if the number of error bits is smaller than the predetermined threshold, determine that the read data passes the first phase ECC test; and if the number of error bits is identical to or greater than the predetermined threshold, determine that the read data fails to pass the first phase ECC test.

10. The memory system of claim 1, wherein the redundancy page comprises ECC parity data associated with the second ECC data, and wherein the memory controller is configured to:

execute an ECC decoding operation on the second ECC data based on the ECC parity data to generate corrected second ECC data; and perform the second phase ECC test on the portion of the read data based on the corrected second ECC data.

11. The memory system of claim 1, wherein the memory comprises a plurality of data pages including the data page as a first data page, the redundancy page being different from each of the plurality of data pages, and wherein the redundancy page comprises a plurality of second ECC data associated with particular portions of page data in the plurality of data pages.

12. The memory system of claim 11, wherein a size of a particular portion of page data in each of the plurality of data pages is identical, and wherein the memory controller is configured to:

for each of the plurality of data pages, generate respective first ECC data based on the page data in the data page, and store the respective first ECC data in the data page; and generate respective second ECC data based on the particular portion of the page data in the data page and a plurality of predetermined values, and store the respective second ECC data for the data page in the redundancy page, wherein a total size of the particular portion of page data in the data page and the plurality of predetermined values are identical to a size of the page data in the data page.

13. The memory system of claim 11, wherein the memory comprises one or more memory chips each having a plurality of blocks, and wherein the plurality of data pages are in a same block of one of the one or more memory chips, and the redundancy page is in the same block or a different block in the one of the one or more memory chips, or wherein at least two of the plurality of data pages are in different blocks of one of the one or more memory chips, and the redundancy page is in the one of the one or more memory chips or a different one of the one or more memory chips, or wherein at least two of the plurality of data pages are in different memory chips of the memory, and the redundancy page is in the memory.

14. The memory system of claim 11, wherein the memory controller is configured to:

generate respective first ECC data based on page data of each of two or more data pages of the plurality of data pages, and store the respective first ECC data in each of the two or more data pages;

generate composite data based on particular portions of the two or more data pages, a size of the composite data being identical to a size of each of the particular portions of the two or more data pages; and generate corresponding second ECC data based on the composite data and a plurality of predetermined values, and store the corresponding second ECC data for the two or more data pages in the redundancy page.

15. The memory system of claim 14, wherein the memory controller is configured to:

read first page data from a first data page of the two or more data pages;

perform a first phase ECC test on the read first page data based on the respective first ECC data of the first data page;

in response to determining that the read first page data fails to pass the first phase ECC test, read other page data from one or more other data pages of the two or more data pages;

read the corresponding second ECC data for the two or more data pages from the redundancy page; and perform a second phase ECC test on a first data portion of the read first page data and the plurality of predetermined values based on the corresponding second ECC data and the other page data from the one or more other data pages.

16. A memory system, comprising:
a memory; and
a memory controller coupled to the memory and configured to:
- generate first Error-Correcting Code (ECC) data based on data in a data page of the memory;
- store the first ECC data together with the data in the data page;
- generate second ECC data based on a portion of the data in the data page; and
- store the second ECC data for the data page in a redundancy page different from the data page.

17. The memory system of claim 16, wherein the memory controller is configured to:
- generate the second ECC data based on the portion of the data in the data page and a plurality of predetermined values,
- wherein a total size of the portion of data in the data page and the plurality of predetermined values are identical to a size of the data in the data page.

18. The memory system of claim 16, wherein the memory controller is configured to:
- read the data from the data page of the memory;
- perform a first phase ECC test on the read data based on the first ECC data in the data page; and
- in response to determining that the read data fails to pass the first phase ECC test, read the second ECC data from the redundancy page, and perform a second phase ECC test on a portion of the read data corresponding to the portion of the data based on the second ECC data.

19. The memory system of claim 16, wherein the memory comprises a plurality of data pages including the data page, the redundancy page being different from each of the plurality of data pages, and
wherein the memory controller is configured to:
- generate respective first ECC data on page data of each of two or more data pages of the plurality of data pages, and store the respective first ECC data together with the page data in each of the two or more data pages;
- generate composite data based on particular portions of the page data of the two or more data pages, a size of the composite data being identical to a size of each of the particular portions of the page data of the two or more data pages; and
- generate corresponding second ECC data based on the composite data, and store the corresponding second ECC data for the two or more data pages in the redundancy page.

20. The memory system of claim 19, wherein the memory controller is configured to:
- read first page data from a first data page of the two or more data pages;
- perform a first phase ECC test on the read first page data based on the respective first ECC data of the first data page;
- in response to determining that the read first page data fails to pass the first phase ECC test, read one or more other particular portions of page data from one or more other data pages of the two or more data pages;
- read the corresponding second ECC data for the two or more data pages from the redundancy page; and
- perform a second phase ECC test on a first data portion of the read first page data and the plurality of predetermined values based on the corresponding second ECC data and the one or more other particular portions of page data from the one or more other data pages.

21. A method comprising:
reading data from a data page of a memory;
performing a first phase Error-Correcting Code (ECC) test on the read data based on first ECC data associated with the data, the first ECC data being stored together with the data in the data page; and
in response to determining that the read data fails to pass the first phase ECC test, performing a second phase ECC test on a portion of the read data based on second ECC data, wherein the second ECC data is associated with a portion of the data corresponding to the portion of the read data, and stored in a redundancy page different from the data page.

22. The method of claim 21, further comprising:
generating the first ECC data based on the data in the data page, and storing the first ECC data in the data page; and
generating the second ECC data based on the portion of the data in the data page and a plurality of predetermined values, and store the second ECC data for the data page in the redundancy page,
wherein a total size of the portion of data in the data page and the plurality of predetermined values are identical to a size of the data in the data page.

* * * * *